UNITED STATES PATENT OFFICE.

WILLIAM H. STEVENS, OF PORTLAND, AND SCOTT C. DUNLAP, OF AMITY, OREGON.

PROCESS FOR CANNING RICE AND MILK.

1,241,163.        Specification of Letters Patent.      Patented Sept. 25, 1917.

No Drawing. Substitute for application Serial No. 126,807, filed October 20, 1916. This application filed May 2, 1917. Serial No. 166,503.

*To all whom it may concern:*

Be it known that we, WILLIAM HENRY STEVENS and SCOTT CUNNINGHAM DUNLAP, citizens of the United States, and residents, respectively, of Portland, Multnomah county, Oregon, and Amity, Yamhill county, Oregon, have invented a certain new and useful Process for Canning Rice and Milk, of which the following is a specification.

The object of our invention is to produce an article of food consisting of cereal and milk, particularly rice and milk, the cereal being rendered ready for use by cooking, and the article as a whole being so treated that it may be preserved in a hermetically sealed container for future use, and that it will remain in a wholesome state for an indefinite length of time.

In the preparation of such an article of food it is essential not only that the ingredients be pasteurized, but that the cereal also be well cooked; at the same time the cooking process must be so conducted as to avoid all danger of scorching. Therefore, in the canning of such an article in large quantities, it is essential to use an efficient and safe process for accomplishing the desired result.

We attain the objects of our invention in the following manner: We take fresh milk and for each 13½ ounces thereof add 2 ounces of rice, previously thoroughly cleaned. The quantity of rice may be slightly increased if desired, but the proportion given by us is found preferable by the average consumer, and is also preferable, we believe, for all the uses to which our product may be put. Since, when carrying on our canning process on a large scale, it is necessary that some quantity of milk be collected beforehand, it is best to pasteurize this milk so as to prevent the same being spoiled by bacteria and the weather before being used; although in the cooking step of our process the sterilization which takes place in cooking the rice and milk together, as hereinafter specified, would otherwise be sufficient to preserve the milk without previous pasteurizing thereof. In the pasteurizing step of the milk, we heat the same to 160 to 170 degrees Fahrenheit for approximately fifteen minutes.

The mixture of milk and rice is then put in a container, such as a can or jar, which is then sealed. The container is then placed in a "sterilizer" or other inclosure, the temperature of which is raised from atmospheric temperature to approximately 236 degrees Fah.; the temperature being gradually brought to the latter degree during a period of eight minutes. The temperature of said container is then held at approximately 236 degrees Fahrenheit for a further twenty minutes. The time mentioned has been relatively determined by us in order to assure thorough cooking of the cereal, at the same time preventing the cooking being carried to the degree of rendering the same mushy. It is necessary that the temperature of said mixture of rice and milk be gradually raised to the cooking point, in order to prevent scorching of either of the materials.

While the sterilizing and cooking process is in operation the container must be constantly agitated so as to prevent the cereal from forming in hard lumps.

After the last mentioned step has been completed, the container is cooled sufficiently to render the same convenient for handling.

We next preferably place the container on a shaking machine, and shake the same for two or three minutes, for the purpose of preventing the adhesion of any particles of the cereal to the sides of the can.

Finally the container is placed in a room in which a temperature is maintained of approximately 110 degrees Fahrenheit, and is there left for a period of four days, in order to determine whether any bacteria are present in the article of food, which would develop and manifest themselves in said period by causing a swelling of the container.

We claim:

1. The process of canning milk and cereal which consists in first heating the milk from 160 to 170 degrees Fahrenheit for a period of approximately 15 minutes; then adding to each 13½ ounces of the milk so treated approximately 2 ounces of cereal; then placing the two articles commingled in a container and hermetically sealing the latter; then gradually heating the container from atmospheric temperature to approximately 236 degrees Fahrenheit, raising the temperature gradually to the higher degree in a period of approximately 8 minutes, and then holding the temperature of the container at approximately 236 degrees Fahrenheit for a further period of approximately twenty minutes, agitating the container constantly during the last mentioned heating process.

2. The process of canning milk and cereal which consists in first heating the milk to from 160 to 170 degrees Fahrenheit for a period of approximately 15 minutes; then adding to each 13½ ounces of the milk so treated approximately 2 ounces of cereal; then placing the two articles commingled in a container and hermetically sealing the latter; then gradually heating the container from atmospheric temperature to approximately 236 degrees Fahrenheit, raising the temperature gradually to the higher degree in a period of approximately 8 minutes, and then holding the temperature of the container at approximately 236 degrees Fahrenheit for a further period of approximately twenty minutes, agitating the container constantly during the last mentioned heating process; and then placing the container on a shaker and submitting the former to the action of the latter for a few minutes.

3. The process of canning milk and cereal which consists in taking a quantity of milk, then adding the cereal to said milk in desired proportion, then placing the two articles commingled in a container and hermetically sealing the latter, then gradually heating the container from its initial temperature to a degree sufficient to cook the cereal, and then holding the temperature at such degree for a time sufficient to thoroughly cook the cereal without rendering the same mushy.

4. The process of canning milk and cereal which consists in pasteurizing a quantity of milk, then adding cereal to said milk in desired proportion, then placing the two articles commingled in a container and hermetically sealing the latter, then gradually heating the container from atmospheric temperature to a degree sufficient to cook the cereal, then holding the temperature at such degree for a time sufficient to thoroughly cook the cereal without rendering the same mushy.

5. The process of canning milk and cereal which consists in pasteurizing a quantity of milk, then adding cereal to said milk in the proportion of two parts, by weight, of the former to 13½ parts of the latter, approximately, then placing the two articles commingled in a container and hermetically sealing the latter, then gradually heating the container from atmospheric temperature to a degree sufficient to cook the cereal, then holding the temperature at such degree for a time sufficient to thoroughly cook the cereal without rendering the same mushy, and agitating the materials during such cooking process.

6. The process of canning milk and cereal which consists in adding cereal to a quantity of milk in desired proportions, then placing the two articles commingled in a container and hermetically sealing the latter, then gradually heating the container from atmospheric temperature to a degree sufficient to cook the cereal, and then holding the temperature at such degree for a time sufficient to thoroughly cook the cereal without rendering the same mushy.

WM. H. STEVENS.
SCOTT C. DUNLAP.

Copies of this patent may be obtained for five cents each, by addressing the "Commissioner of Patents, Washington, D. C."